US008076030B2

(12) United States Patent
Zhang et al.

(10) Patent No.: US 8,076,030 B2
(45) Date of Patent: Dec. 13, 2011

(54) ALKALI METAL TITANATES, AND ELECTRODES AND BATTERIES BASED ON THE SAME

(75) Inventors: Pu Zhang, Ann Arbor, MI (US); Suresh Mani, Ann Arbor, MI (US); Yet-Ming Chiang, Framingham, MA (US); Shih-Chieh Yin, Ann Arbor, MI (US); Brian Glomski, Ypsilanti, MI (US); Young-Il Jang, Newtonville, MA (US); Christopher Silkowski, Livonia, MI (US); Michael R. Wixom, Ann Arbor, MI (US)

(73) Assignee: A123 Systems, Inc., Waltham, MA (US)

( * ) Notice: Subject to any disclaimer, the term of this patent is extended or adjusted under 35 U.S.C. 154(b) by 837 days.

(21) Appl. No.: 11/954,955

(22) Filed: Dec. 12, 2007

(65) Prior Publication Data

US 2009/0170002 A1 Jul. 2, 2009

Related U.S. Application Data (63) Continuation-in-part of application No. 11/757,658, filed on Jun. 4, 2007, now Pat. No. 7,879,493.

(60) Provisional application No. 60/810,942, filed on Jun. 5, 2006, provisional application No. 60/822,675, filed on Aug. 17, 2006.

(51) Int. Cl.
*H01M 4/58* (2010.01)
*C01G 23/00* (2006.01)
(52) U.S. Cl. .................................. 429/231.1; 423/598
(58) Field of Classification Search ............... 429/231.1; 423/598
See application file for complete search history.

(56) References Cited

U.S. PATENT DOCUMENTS

| 5,545,468 | A | 8/1996 | Koshiba et al. |
| 6,221,531 | B1 | 4/2001 | Vaughey et al. |
| 6,372,384 | B1* | 4/2002 | Fujimoto et al. ........... 429/231.1 |
| 6,475,673 | B1 | 11/2002 | Yamawaki et al. |
| 6,645,673 | B2 | 11/2003 | Yamawaki et al. |
| 6,759,166 | B2 | 7/2004 | Wang et al. |
| 6,881,393 | B2 | 4/2005 | Spitler et al. |
| 6,890,510 | B2 | 5/2005 | Spitler et al. |
| 7,211,350 | B2 | 5/2007 | Amatucci |
| 2004/0217335 | A1 | 11/2004 | Sterzel |
| 2007/0009798 | A1* | 1/2007 | Inagaki et al. ............. 429/231.1 |

* cited by examiner

*Primary Examiner* — Karie O'Neill Apicella
(74) *Attorney, Agent, or Firm* — Gifford, Krass, Sprinkle, Anderson & Citkowski, P.C.

(57) ABSTRACT

Disclosed is a lithium titanate material, which may include an additive, and its use as an electrode in a battery. Specifically disclosed is a lithium titanate based material, with primary particle size larger than 100 nm, having very good high rate charge and discharge capabilities when incorporated into a lithium battery.

18 Claims, 7 Drawing Sheets

Prior Art Nano LTO

FIG. 6A

Pristine LTO of Present Invention

FIG. 6B

Composite LTO of Present Invention

ALKALI METAL TITANATES, AND ELECTRODES AND BATTERIES BASED ON THE SAME

CROSS-REFERENCE TO RELATED APPLICATIONS

This application is a continuation-in-part of U.S. patent application Ser. No. 11/757,658 filed Jun. 4, 2007, which claims priority of U.S. Provisional Patent Application Ser. No. 60/810,942 filed Jun. 5, 2006, entitled "Alkali Metal Titanates and Methods for Their Synthesis"; and U.S. Provisional Patent Application Ser. No. 60/822,675 filed Aug. 17, 2006, entitled "Doped Lithium Titanate Material and Methods for Its Manufacture", all of which are incorporated herein by reference.

FIELD OF THE INVENTION

This invention relates generally to alkali metal titanates, and more particularly to lithium titanates. More specifically, the invention relates to lithium titanates with superior electrochemical properties, and more particularly with superior rate capabilities when incorporated into lithium batteries.

BACKGROUND OF THE INVENTION

Alkali metal titanates have electrochemical properties which make them desirable as electrode materials for a variety of devices. Lithium titanate ($Li_4Ti_5O_{12}$ or LTO) has been found to have particular utility as an electrode material for lithium batteries. It is a relatively low-cost material, and exhibits high performance characteristics in lithium batteries; consequently, it is anticipated to have significant utility as an electrode material for high performance, high power batteries such as those utilized in hybrid electric vehicles and other high power applications.

One important characteristic of high power, high performance batteries is rate capability. That is, the rate at which the batteries can take up and deliver an electrical charge. This parameter is particularly important under high charge/discharge rates as are encountered in electric vehicles and other high power applications.

First cycle reversibility is another very important parameter for rechargeable lithium batteries. This parameter measures the decline in storage capacity when a freshly manufactured lithium battery is initially cycled. Manufacturers compensate for this initial loss by building extra capacity into batteries. However, this approach increases the size and cost of batteries, and industry has always sought to limit magnitude of first cycle reversibility.

Various lithium titanate materials are commercially available and are utilized in the manufacture of lithium batteries. However, heretofore available commercial materials produce lithium batteries having first cycle reversibilities of approximately 80%, which represents a significant inefficiency. In addition, prior art batteries incorporating lithium titanate materials suffer from problems of high rate charge and discharge capacities, and these limitations are a significant detriment to their use in high power applications for electric vehicles, power tools and the like. In an effort to improve high rate performance, the prior art has believed that lithium titanate spinel materials having extremely high surface areas and correspondingly small particle sizes, typically in the nanoscale regime below 100 nanometers, must be employed in order to obtain good high rate performances. Such materials are disclosed, for example, in U.S. Pat. No. 7,211,350. Conventional wisdom in the prior art is that high rate capability cannot be expected from larger particle size and correspondingly lower specific surface area materials. Processes for the preparation of high surface area, nanoscale lithium titanate materials as well as processes and structures for their incorporation into battery systems are complex, expensive and difficult to implement. Therefore, it will be appreciated that there is a need in the art for improved lithium titanate electrode materials which can provide good performance characteristics in terms of high rate capacities and improved first cycle reversibilities in batteries incorporating such materials. In addition, such materials and batteries should be simple and economical to fabricate and utilize. As will be explained in detail hereinbelow, the present invention provides improved lithium titanate materials which manifest very good performance characteristics even when implemented in particle size formats outside of the prior art nanoscale range. These and other advantages of the invention will be apparent from the drawings, discussion and description which follow.

SUMMARY OF THE INVENTION

Disclosed is a lithium titanate material having an average particle size of at least 100 nm. In some instances, the material has an average particle size of at least 150 nm, and in specific instances, the particles of the material fall in the general size range of 150-500 nm. The material has a correspondingly low surface area, and in general the material has a surface area, as measured by the BET method, of no more than 20 $m^2/g$, and in some instances no more than 15 $m^2/g$. In particular implementations, the material has a BET surface area of approximately 3-7 $m^2/g$. The material may be prepared in pristine form or composite form incorporating additives, and in some instances, the additive may comprise a transition metal, with Zr being one specific transition metal utilized in some embodiments.

The material is further characterized by having low agglomeration. The material has a pore size distribution such that it includes a first distribution of pore sizes in the range of 0.1-1 micron (and in particular instances 0.2-0.6 microns); and a second distribution of pore sizes in the range of 1-100 microns (and in particular instances 5-50 microns). The total volume of the pores of the first size distribution is greater than those of the second size distribution. In particular instances, the volume pores of the first size distribution will comprise 45-60% of the total pore volume and those of the second distribution will comprise 25-40% of the total volume. Materials of the present invention, when incorporated into battery systems, manifest very good high rate charge and discharge capabilities together with very good first cycle reversibilities.

Also disclosed is a lithium titanate composite material incorporating additives. In particular instances, the additive may comprise a transition metal, and this metal may be one or more of V, Zr, Nb, Mo, Mn, Fe, Cu, and Co. The additive may be present in amounts up to 20 weight percent, and in specific instances in the range of 0.1-5 weight percent. In a particular instance, the additive comprises Zr.

The composite material is further characterized by having the form of particles with more faceted shape than the pristine material.

Further disclosed are electrodes which include alkali metal titanates in accord with the foregoing, as well as batteries in which these electrodes comprise the anodes.

BRIEF DESCRIPTION OF THE DRAWINGS

FIGS. 8A-8I are SEM images (left) and porosity analysis (right) of electrodes including materials of the present invention.

DETAILED DESCRIPTION OF THE INVENTION

In accord with one aspect of the invention there is provided a lithium titanate composite material. Generally, lithium titanate is recognized as having the formula $Li_4Ti_5O_{12}$; however, as is recognized in the art, the stoichiometry of this material may, in some instances, vary without significantly altering the fundamental nature of the material. Such variations may be resultant from a slight oxidation or reduction of the material, minor variations of the LiTi ratio and the presence of adding species. Accordingly, within the context of this disclosure, all of such stoichiometric and non-stoichiometric materials are encompassed within the definition of lithium titanate.

In a specific group of embodiments, the lithium titanate is prepared from a starting material that includes a transition metal in an amount up to approximately 20 weight percent, and some such transition metals include one or more of V, Zr, Nb, Mo, Mn, Fe, Cu, and Co. In one particular instance, as is discussed herein, the additive comprises Zr, and in particular instances is present in an amount of 0.1-5 weight percent of the material. The transition metal may aid in controlling the morphology of the material and/or it may act as a dopant or modifier.

There is a fairly large body of prior art directed to the synthesis of lithium titanate materials, and various processes known in the art may be utilized to prepare the lithium titanate composite materials described above. While such prior art processes may be utilized, it has further been found in accord with the present invention that very high quality alkali metal titanates, both in pristine form and composite form, can be prepared by a process disclosed in U.S. patent application Ser. No. 11/757,658, June 2007, incorporated herein by reference, which involves impact milling of the starting materials to produce an intimate mixture. In a typical procedure, the starting materials will include a source of lithium such as lithium carbonate and a source of titanium such as titanium dioxide. When an additive is incorporated in the material an appropriate amount of a precursor is added to the mixture. For example, when the composite material includes zirconium, a compound such as zirconium acetate, carbonate, chloride, alkoxide or the like may be added. This mixture is then reacted at elevated temperatures to produce the alkali metal titanate.

It has been found that materials of the present invention can be synthesized in the form of particles larger than 100 nm which can provide performance characteristics equal to, or exceeding those oft prior art nanoscale titanate materials. In that regard, the materials of the present invention may comprise lithium titanate spinels in the form of particle aggregates having a specific surface area of 3-7 $m^2/g$ as measured by the BET method. The material has a pore size distribution such that it includes a first distribution of pore sizes in the range of 0.1-1 micron (and in particular instances 0.2-0.6 microns); and a second distribution of pore sizes in the range of 1-100 microns (and in particular instances 5-50 microns). The total volume of the pores of the first size distribution is greater than those of the second size distribution. In particular instances, the volume pores of the first size distribution will comprise 45-60% of the total pore volume and those of the second distribution will comprise 25-40% of the total volume. The lower surface area of the materials of present invention allows the present materials to be more stable and safer than the prior art nano material in an electrochemical environment. The lower surface area of the materials of present invention also allows the present materials, when incorporated into electrodes, to be pressed into denser forms. Thus higher specific energy can be achieved from the batteries utilizing the present lithium titanate materials. As will be explained in further detail, these materials can be incorporated into batteries which have very high rate capabilities and low first cycle losses.

In an experimental series, materials of the present invention were prepared in accord with the synthesis method set forth hereinabove, and their performance characteristics, when incorporated into test cells, were compared with those of conventional lithium titanate materials, including those having nanoscale particle sizes.

Figure 1:
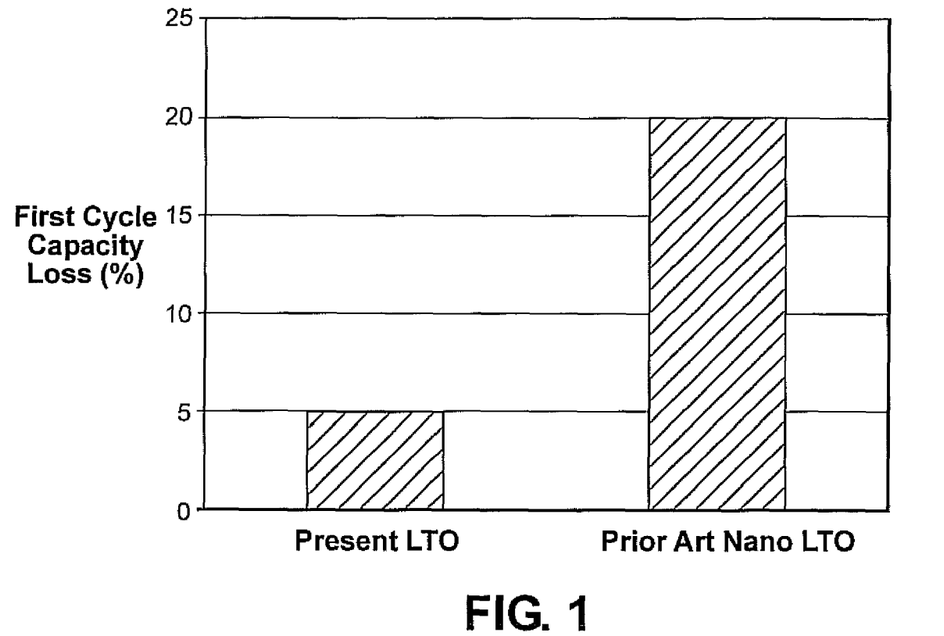
FIG. 1 is a graph illustrating the first cycle capacity loss of a prior art cell and a cell which incorporates the present lithium titanate material.

In a first evaluation, a series of half cells including lithium titanate materials of the present invention and prior art nano lithium titanate materials were prepared and the first cycle capacity loss of the cells were measured, and the results thereof are shown in FIG. 1. As will be seen, these cells utilizing present materials demonstrated a first cycle capacity loss of approximately 5%, as compared to typical losses of approximately 20% in similar cells prepared utilizing commercially available nano lithium titanate anode materials.

Figure 2:
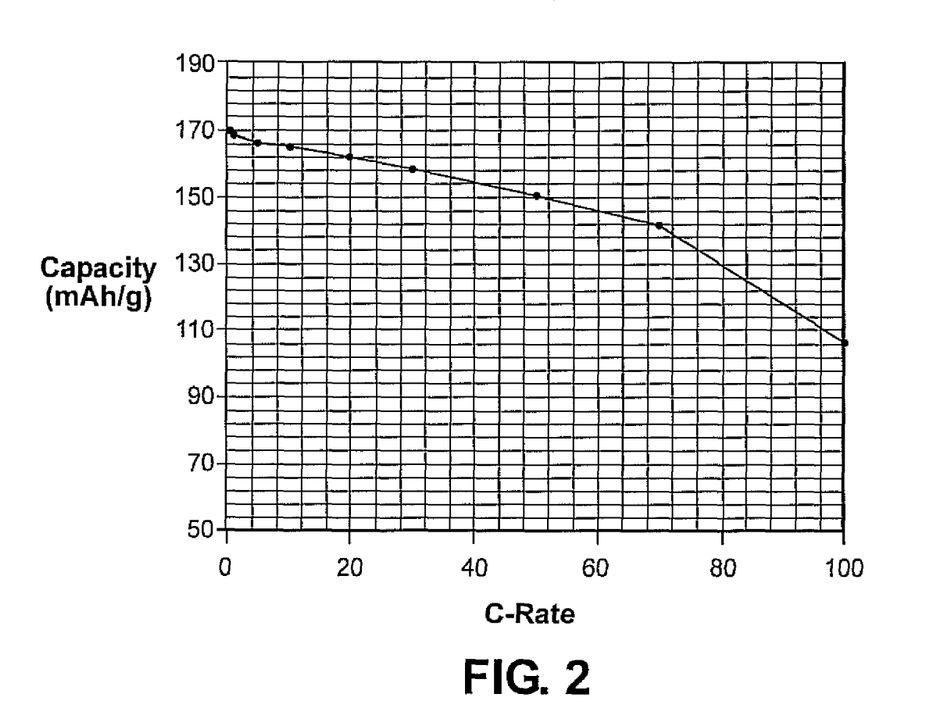
FIG. 2 is a graph showing the charge capacity of a particular material as a function of rate.

In another evaluation, a series of half cells including lithium titanate materials of the present invention were prepared and discharged (lithiated) under CCCV mode operation (2.2 to 0.8V, 1 C constant current and tapering at 0.8V to C/2), then charged (delithiated) to 2.2V under various current (C-rate) conditions. As is summarized in FIG. 2, the materials of the present invention show extremely high rate delithiation capability, for example as high as 90% of initial capability at 50 C and 65% at 100 C.

Figure 3:
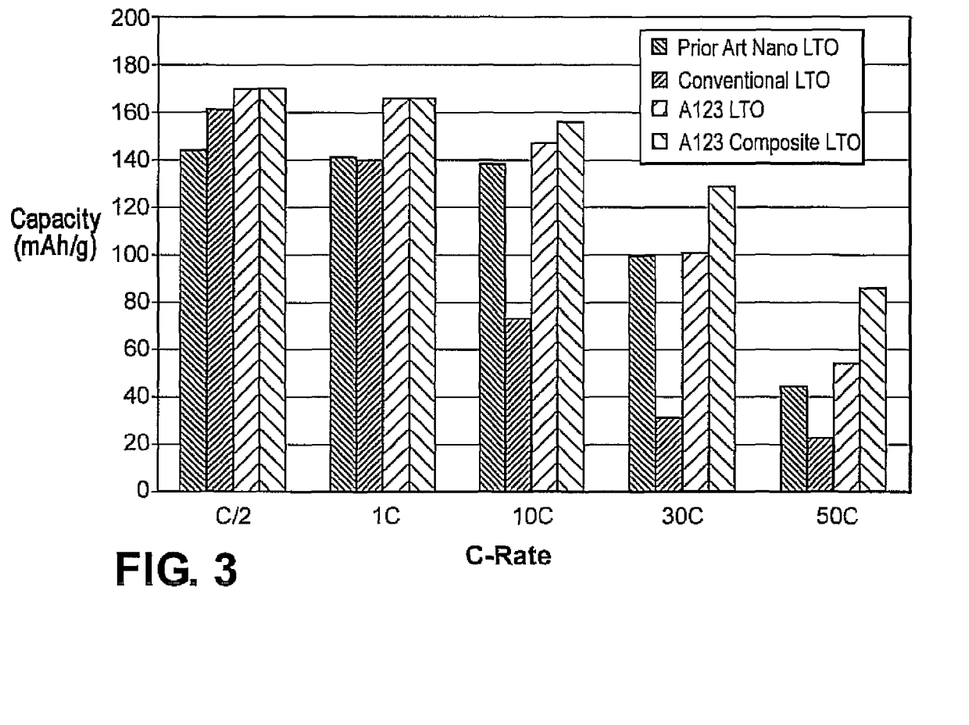
FIG. 3 is a chart comparing the rate performance of materials of the present invention with those of the prior art.

In a further evaluation, the thus prepared lithium titanate half cells were compared with corresponding cells fabricated from prior art nanoscale lithium titanate material as well as conventional non-nanoscale prior art lithium titanate materials. The materials of the present invention were tested in both pristine and composite form. In this evaluation, both discharge and charge processes of the cells were in a constant current mode at various C-rates. For instance, a cell is discharged and charged both at C/2, and then discharged and charged both at 1 C, and further discharged and charged both at higher rates up to 50 C. The data from this experimental series is summarized in FIG. 3. As will be seen, the materials of the present invention outperform those of the prior art under all conditions, and at very high rate conditions, the composite material of the present invention which has been prepared with approximately 1% of a Zr additive provides distinctly superior performance.

Figure 4:
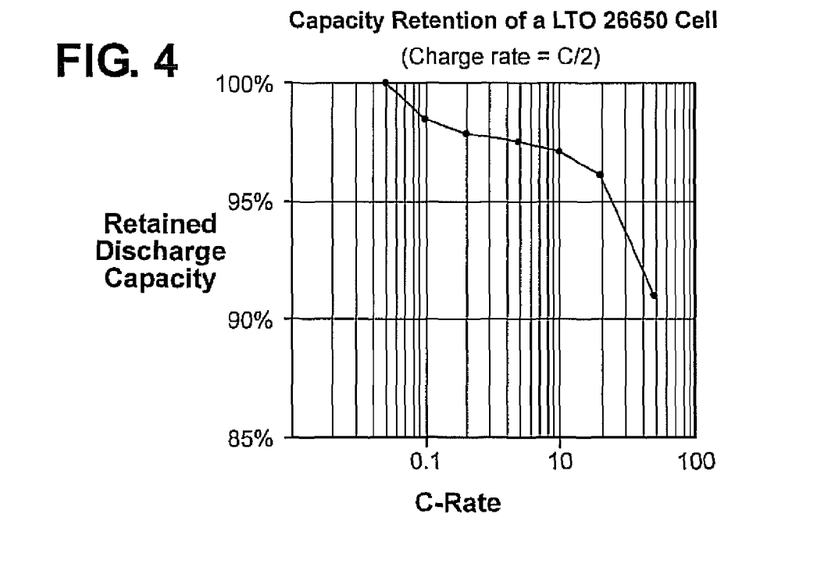
FIG. 4 is a graph showing the capacity retention of a cell which incorporates a lithium titanate anode.

The Li ion cells which include lithium titanate anodes of present invention, and A123 proprietary nano-phosphate cathodes were prepared and evaluated. FIG. 4 shows the rate capability of cells prepared utilizing the present lithium titanate materials. As will be seen, the cell of FIG. 4 shows an excellent rate capability with 98% capacity retention at a 20 C discharge rate, and 91% capacity retention at a 50 C rate. Cells of this type have excellent utility in high power, high performance applications.

Figure 5:
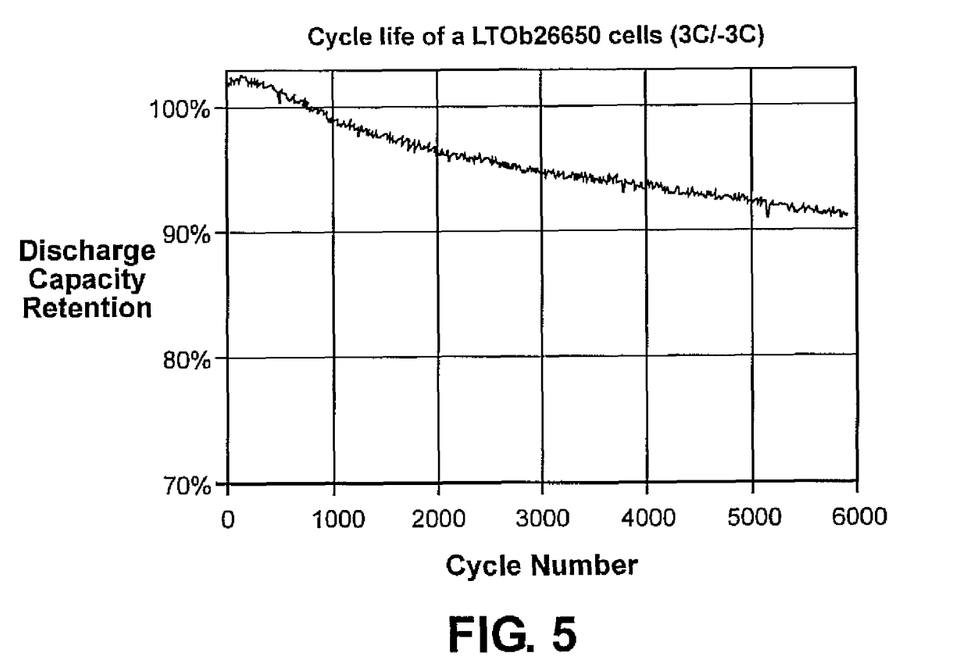
FIG. 5 is a graph showing the cycle life of the cell of FIG. 4.

FIG. 5 shows the cycle life of a cell of the type illustrated with reference to FIG. 4 and depicts discharge capacity retention as a function of charge/discharge cycles carried out at 3 C/−3 C. As will be seen, this cell retains over 90% of its capacity after 6000 cycles.

It is particularly notable that the materials of the present invention have particle sizes which are significantly greater than those of the nanoscale materials of the prior art and yet provide distinctly superior performance. Measurements of crystallite size of the present materials and prior art nanoscale lithium titanate materials were made from X-ray diffraction data. The prior art nanoscale lithium titanate material had a crystallite size of approximately 34 nm. The pristine material of the present invention had a crystallite size of approximately 196 nm, while the composite material of the present invention had a crystallite size of approximately 170 nanometers.

The morphology of the material of the present invention was further investigated through a series of measurements of pore size distribution carried out by the method known in the art as mercury intrusion. Pore sizes were measured and data analyzed by graphing results of the measurement in term of pore size diameter versus log differential intrusion in units of milliliters per gram. Measurements were carried out on prior art nanoscale material, prior art conventional material and on both pristine and composite material of the present invention as described above. Pore size diameters for the conventional material and the two materials of the present invention had a primarily bimodal distribution with a first group of pores corresponding to pores formed between the primary particles of the material. A second distribution corresponded to pores formed between aggregates of the primary particles. The nanoscale material had a significant third distribution of pores corresponding to second order agglomerates, that is to say pores formed between agglomerates.

The data establishes that the materials of the present invention have a lower degree of agglomeration than the conventional material. Furthermore, the prior art nanoscale material has a very high degree of agglomeration showing a significant second order agglomeration. Specifically, as evaluated in this series, the pristine material of the present invention has a pore distribution in which approximately 50% of the pores are in the 0.1-1.0 micron range corresponding to pores between primary particles, and approximately 30-35% of the pores are in the size range of 1-100 microns corresponding to pores between agglomerates. The additive based, composite material of the present invention showed a still higher degree of primary porosity with approximately 55% of the pores being in the 0.1-1.0 micron range and approximately 25-35% of the pores being in the 1-100 micron range. In comparison, conventional materials showed approximately 40% of porosity being in the primary range and approximately 35-40% of the porosity being in the 1-100 micron range indicative of agglomerates.

By contrast, the prior art nanoscale material showed only 11% of porosity being in the primary range, which in this instance was 0.003-0.03 microns. 67% of the porosity of the nanoscale material was in the 0.03-0.4 micron range attributable to agglomerates, and approximately 20% of the porosity was in the second order agglomerate range of 0.4-180 microns.

Figure 6A:
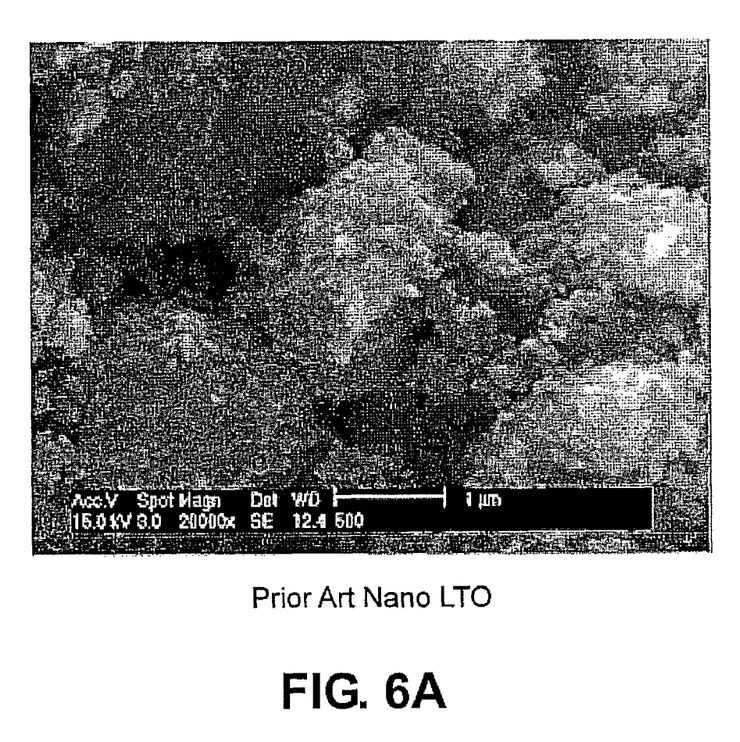
FIGS. 6A-6C are SEM images of materials of the present invention.
Figure 6B:
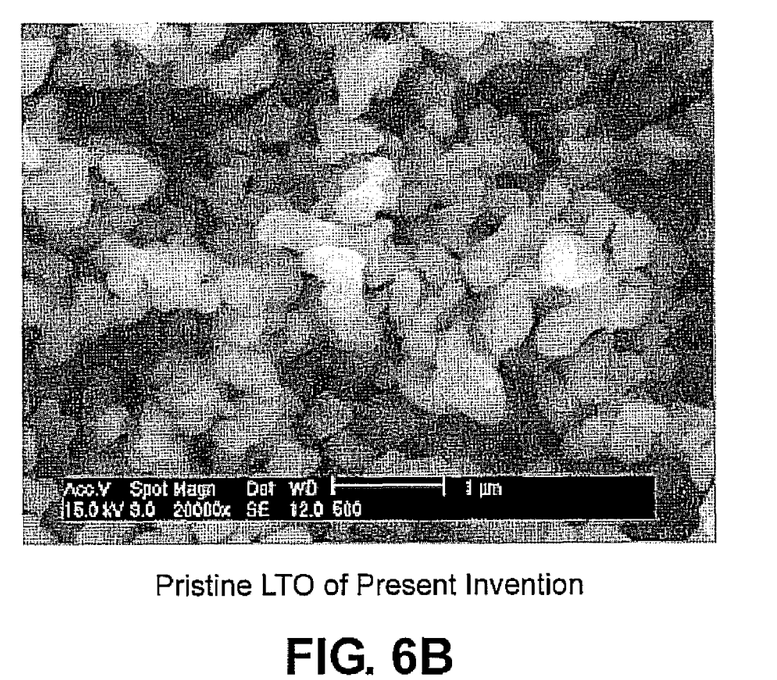
Figure 6C:
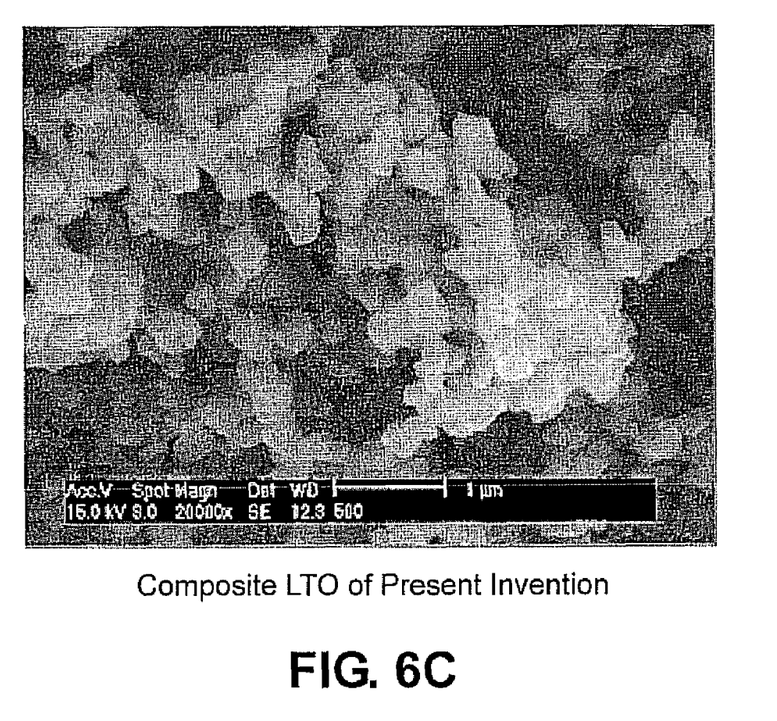
Figure 7A:
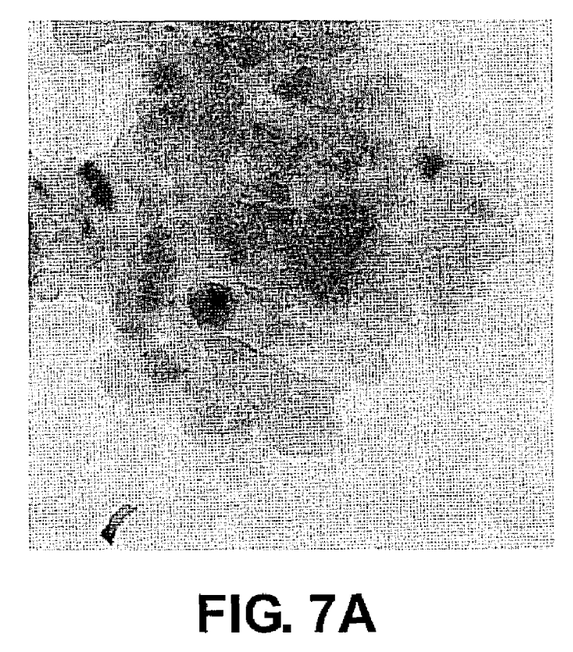
FIGS. 7A-7C are TEM images of materials of the present invention.
Figure 7B:
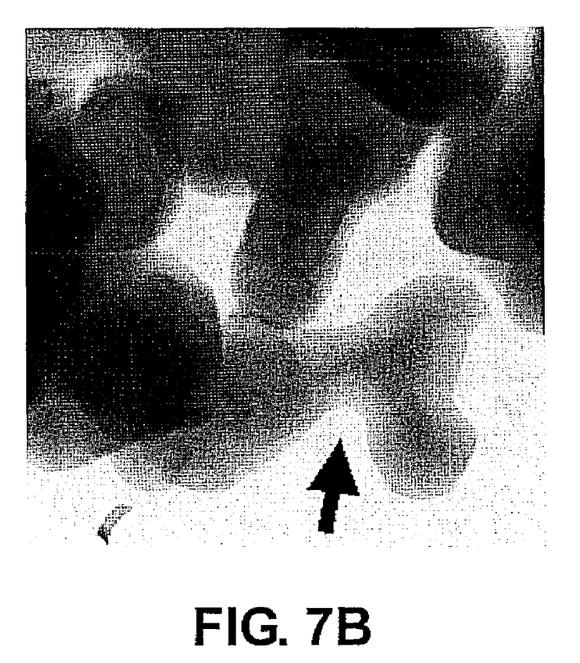
Figure 7C:
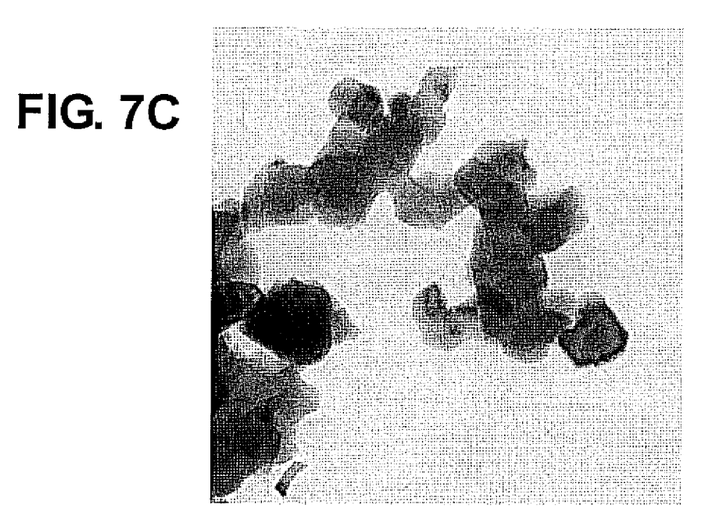
Figure 8A:
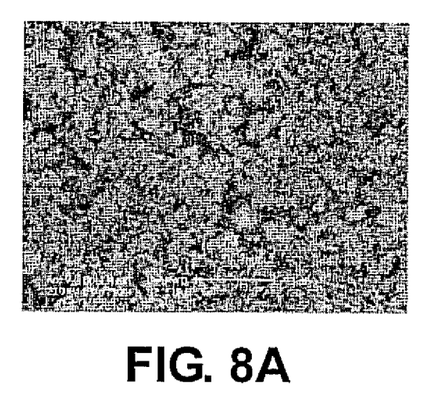
Figure 8B:
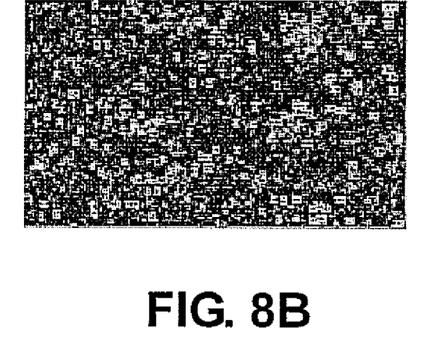
Figure 8C:
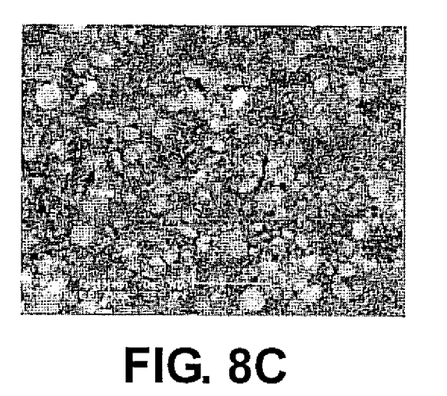
Figure 8D:
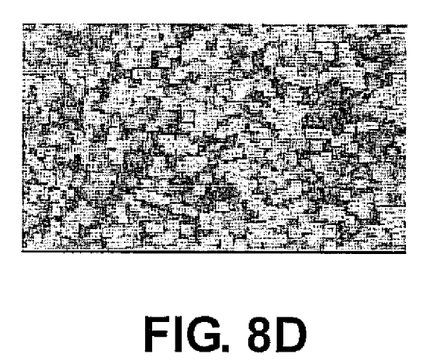
Figure 8E:
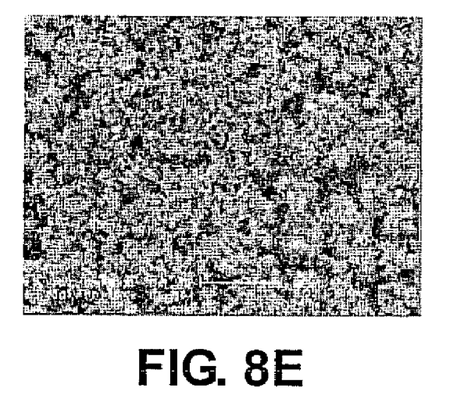
Figure 8F:
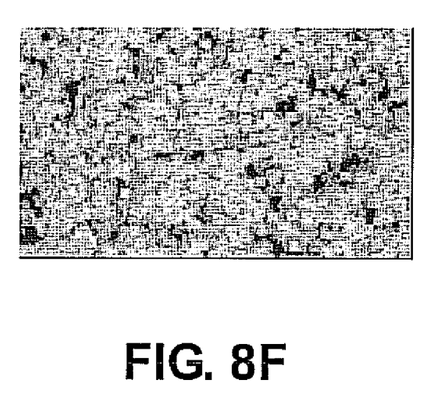
Figure 8H:
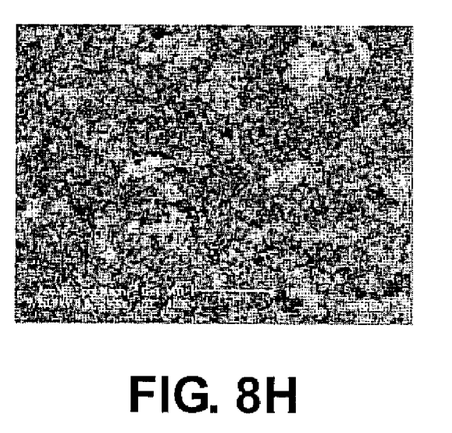
Figure 8I:
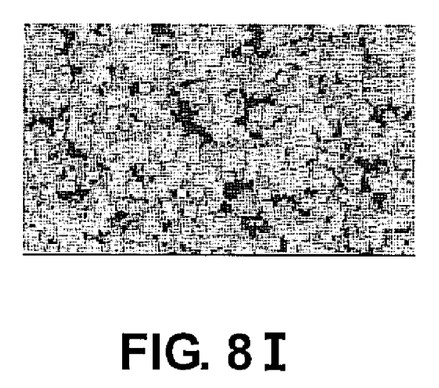

In a further series of evaluations, the surface area of the materials was measured by the BET method, and particle size was determined in three different methods. In the first method, the BET spherical particle size of the materials was determined using the formula diameter=6/(surface area×density) where density of the lithium titanate was assumed to be 3.50 g/cm$^3$. In a second method, particle size was determined from measurements made by scanning electron microscopy (SEM), and in a third method, the particle size was determined from measurements made by transmission electron microscopy (TEM). The SEM images are shown in FIGS. 6A-6C and TEM images are shown in FIGS. 7A-7C. As will be seen, materials of present invention show the forms of low agglomeration, where the composite material particles are more facet shaped than are the pristine material particles. Some particles of present materials show the forms of necks that indicate early-stage sintering (but not fully sintering) of particles (see arrow in FIG. 7B). The early-stage sintered particles may form the agglomerate structure as described above and provide better electronic conductivity paths than isolated particles, which can improve the rate capability. The surface area and particle size data from this series of tests is summarized in Table 1 hereinbelow. As will be seen, materials of the present invention have relatively large particle sizes and relatively low surface areas as compared to prior art nanoscale lithium titanate materials; yet, as shown above, the materials of the present invention provide performance characteristics far superior to those of the prior art.

TABLE 1

| Sample | BET surface area (m$^2$/g) | BET spherical particle size (nm) | SEM particle size (nm) | TEM particle size (nm) |
| --- | --- | --- | --- | --- |
| Prior art nano LTO | 60.0 | 29 | 40 | 20 |
| Present pristine LTO | 4.2 | 408 | 350 | 250 |
| Present composite LTO | 5.5 | 309 | 300 | 200 |

In general, the materials of the present invention have particle sizes which are greater than 100 nanometers, and more particularly greater than 150 nanometers. All particle size measurements may depend to some degree upon methods by which such measurements are made. In general, the particles of the present invention will not be below this size range, and in specific embodiments, will typically be in the range of 150-500 nanometers. The surface area of materials of the present invention is generally no more than 20 m$^2$/g, and in particular instances no more than 15 m$^2$/g. In specific instances, the surface area is in the range of 3-7 m$^2$/g, with all surface area measurements herein being as measured by the BET method. The structure of the material is such that the primary particles have a lower degree of agglomeration as compared to prior art materials. In this regard, in a typical material, 45-60% of the porosity will be attributable to spaces between primary particles. In this regard, this porosity will be in the general size range of 0.1-1.0 microns, and in particular instances 0.2-0.6 microns. In materials of the present invention, the porosity attributable to agglomerates of the primary particles will be lower than the primary porosity. In a typical material, 25-40% of the porosity will be attributable to the agglomerates, and this porosity will generally have a size in the range of 1-100 microns, and in particular instances 5-50 microns. In general, the degree of porosity attributable to the primary particles will be higher in the materials of the present invention as compared to prior art materials. While not wishing to be bound by speculation, it is believed that the pore size of the first distribution may contribute to high rate capability, and the second distribution of pore sizes may contribute to good electrolyte wetting, both of which are essential to high quality performance. It has been found that, in general, the composite materials of the present invention have slightly lower degrees of agglomeration than do the pristine materials, and in this regard have a generally higher percentage of porosity in the first distribution as compared to pristine materials. Micrographic data also suggests that the composite materials have a more faceted particle structure.

In a measurement made by SEM image analysis, the electrodes which include materials of the present invention show higher porosity than the electrodes including prior art materials (as shown in FIGS. 8A-8I). For instance, an electrode including pristine material of present invention has a porosity of 25% and an electrode including composite material of present invention has a porosity of 33%. While an electrode including prior art conventional material has a porosity of 2% and an electrode including prior art nano material has a porosity of 6%.

From the foregoing, it will be understood that materials of the present invention, both pristine and composite, can be prepared so as to combine relatively large particle sizes with very high performance characteristics. In accord with the teachings presented herein, such materials may be readily prepared and utilized by those of skill in the art.

As will be seen, the present invention provides high quality lithium titanate materials. The materials of the present invention have properties which allow for the fabrication of lithium batteries which are stable, efficient, and capable of reliably delivering very high levels of power. These properties, together with the low costs achieved through the use of the previous disclosed methods (U.S. patent application Ser. No. 11/757,659, June 2007), make this technology particularly advantageous for the manufacture of high power battery systems such as those used in electric vehicles, large power tools, power backup systems, and the like.

While the invention has been described with reference to particular lithium titanate materials, it is to be understood that it may be utilized for the preparation of other alkali metal titanates. Also, while specific composite lithium titanate materials incorporated with transition metals have been described, it is to be understood that the present invention is broadly applicable to pristine and composite materials, and in those instances where composite materials are utilized, additives other than transition metals may be utilized.

In view of the teaching presented herein, further modifications and variations will be apparent to those of skill in the art. Accordingly, the foregoing is understood to be an illustration, but not a limitation, upon the practice of the invention. It is the claims, including all equivalents, which define the scope of the invention.

The invention claimed is:

1. A lithium titanate material comprised of aggregates and agglomeration of particles, said particles having an average size of more than 100 nm and a surface area of no more than 20 $m^2/g$ as measured by the BET method, said material including a zirconium additive.

2. The material of claim 1, wherein said particles have an average size of more than 150 nm.

3. The material of claim 1, wherein said particles have an average size in the range of 150-500 nm.

4. The material of claim 1, wherein the surface area of said material, as measured by the BET method, is less than 15 $m^2/g$.

5. The material of claim 1, wherein the surface area of said material, as measured by the BET method, is in the range of 3-7 $m^2/g$.

6. The material of claim 1, wherein said particles have a crystallite size, as measured by XRD, is more than 100 nm.

7. The material of claim 1, wherein said particles have a crystallite size, as measured by XRD, is in the range of 150-250 nm.

8. The material of claim 1, wherein said material has a pore size distribution such that it includes a first distribution of pore sizes in the range of 0.1-1 micron, and a second distribution of pore sizes in the range of 1-100 microns.

9. The material of claim 8, wherein the volume of the pores in said first distribution is greater than the volume of the pores in said second distribution.

10. The material of claim 8, wherein the first distribution of pore sizes are in the range of 0.2-0.6 micron.

11. The material of claim 8, wherein the second distribution of pore sizes are in the range of 5-50 microns.

12. The material of claim 1, wherein the inclusion of said zirconium additive results in one or more of following: reducing the particle size of said material, reducing the crystallite size of said material, increasing the surface area of said material, producing more separated particles of said material, producing more faceted particles of said material, and improving the rate capability of said material.

13. The material of claim 1, wherein said zirconium additive comprises 0.01-20 weight percent of said material.

14. The material of claim 1, wherein said zirconium additive comprises 0.1-5 weight percent of said material.

15. An electrode which includes the material of claim 1.

16. The electrode of claim 15, wherein the porosity of said electrode prior to calendering is in the range of 10-50%, as measured by SEM image analysis.

17. The electrode of claim 15, wherein the porosity of said electrode prior to calendering is greater than 20%, as measured by SEM image analysis.

18. A battery which includes the electrode of claim 15.

* * * * *

UNITED STATES PATENT AND TRADEMARK OFFICE
CERTIFICATE OF CORRECTION

PATENT NO. : 8,076,030 B2  
APPLICATION NO. : 11/954955  
DATED : December 13, 2011  
INVENTOR(S) : Pu Zhang et al.

Page 1 of 1

It is certified that error appears in the above-identified patent and that said Letters Patent is hereby corrected as shown below:

On the Title Page:

(56) References Cited US PATENT DOCUMENTS  
Delete "6,759,166" insert --6,759,168--.

In the Specification:

At column 7, line number 41 Delete "11/757,659" insert --11/757,658--.

Signed and Sealed this  
Nineteenth Day of February, 2013

Teresa Stanek Rea  
*Acting Director of the United States Patent and Trademark Office*